United States Patent [19]
Dougherty et al.

[11] Patent Number: 6,103,853

[45] Date of Patent: Aug. 15, 2000

[54] AMINE CURING AGENTS AND EPOXY COATINGS PRODUCED USING SAME

[75] Inventors: T. Kirk Dougherty, Playa del Rey; Steven E. Lau, Harbor City; Teresa L. Rosales, Redondo Beach; Steven A. Tunick, Granada Hills, all of Calif.

[73] Assignee: Raytheon Company, Lexington, Mass.

[21] Appl. No.: 09/015,112

[22] Filed: Jan. 29, 1998

[51] Int. Cl.$^7$ .................................................. C08G 59/68
[52] U.S. Cl. ................................ 528/94; 528/33; 556/424
[58] Field of Search .............................. 528/33, 38, 94; 556/424

[56] References Cited

U.S. PATENT DOCUMENTS

| | | | |
|---|---|---|---|
| 4,507,412 | 3/1985 | Hickner et al. | 525/528 |
| 4,874,643 | 10/1989 | Oldham et al. | 427/340 |
| 5,587,409 | 12/1996 | Dreischhoff et al. | 528/110 |

FOREIGN PATENT DOCUMENTS

| | | |
|---|---|---|
| 265381 | 6/1990 | Czechoslovakia . |
| 44816 A1 | 1/1982 | European Pat. Off. . |

*Primary Examiner*—Robert Dawson
*Assistant Examiner*—D. Aylward
*Attorney, Agent, or Firm*—Colin M. Raufer; Leonard A. Alkov; Glenn H. Lenzen, Jr.

[57] ABSTRACT

Amine adducts comprising a reactive amine curing agent containing an aromatic silane epoxy along with improved coatings made by combining the amine adduct with additional epoxy material. The amine adducts, when formulated and cured with an epoxy material, cures in several hours and gives a protective coating material that cures without blush or $CO_2$ incorporation. Specific embodiments of the amine adduct contain a bisepoxy compound, such as 2,11-bis(3-glycidylphenyl)-2,11dimethyl-2,11-disiladodocane (n=4), for example, while the amine functionalized compound may be ethylenediamine (90° C., 120.2 g, 20 mol) or aminoethylpiperazine, respectively. A number of chemical compounds are also disclosed.

14 Claims, 1 Drawing Sheet

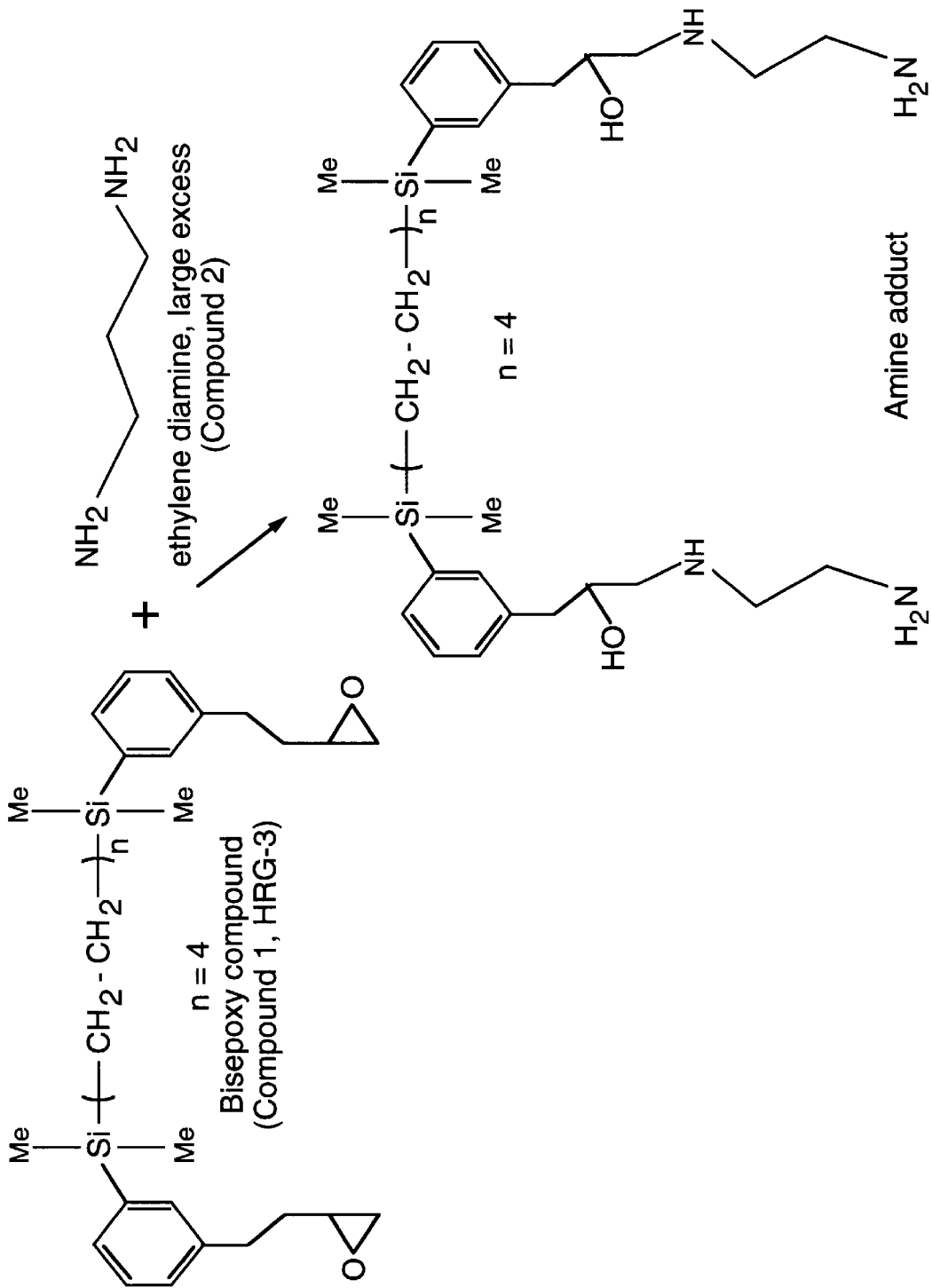

AMINE CURING AGENTS AND EPOXY COATINGS PRODUCED USING SAME

BACKGROUND

The present invention relates generally to aromatic silane epoxy coatings, and more particularly, to reactive amine terminated curing agents containing aromatic silane materials, to improved epoxy or epoxy silane resin coatings cured with amine terminated aromatic silane containing materials that cure rapidly at room temperature. And to amine terminated curing agents containing the aromatic silane materials that combine with aromatic silane epoxy resins or other epoxy resins to form improved coatings that cure without blush or $CO_2$ incorporation.

The closest prior relating to the present invention is U.S. Pat. No. 4,874,643 assigned to the assignee of the present invention. The aromatic silane epoxy coating disclosed in U.S. Pat. No. 4,874,643 has a relatively slow room temperature curing time, and exhibits blush and $CO_2$ incorporation. In particular, U.S. Pat. No. 4,874,643 discloses an aromatic silane epoxy coating useful as an erosion resistant material. In practice, however, the present inventors have found that this material is difficult to formulate into a room temperature curing coating. Even when formulated with very reactive epoxy diluents and amine curing agents, full curing of this material occurs at room temperature only after 72 hours.

Accordingly, it is an objective of the present invention to provide for reactive amine curing agents combined with aromatic silane epoxy materials that produce reactive amine terminated curing agents containing the aromatic silane materials. It is a further objective of the present invention to provide an epoxy or epoxy silane resin cured with the amine terminated aromatic silane containing material to form improved coatings that cure rapidly at room temperature. It is a further objective of the present invention to provide for amine terminated curing agents containing the aromatic silane materials that combine with aromatic silane epoxy resins or other epoxy resins to form coatings that cure without blush or $CO_2$ incorporation.

SUMMARY OF THE INVENTION

To accomplish the above and other objectives, the present invention provides for amine adducts comprising a reactive amine curing agent containing an aromatic silane epoxy described in U.S. Pat. No. 4,874,643. A number of chemical compounds are also disclosed.

This new constitution of matter, when formulated and cured with available epoxy resins, cures in several hours (not days) and gives a protective coating material with erosion resistant properties superior to coatings formed using the room temperature curing version of the aromatic silane epoxy described in U.S. Pat. No. 4,874,643. In addition to permitting a faster room temperature cure compared to the aromatic silane epoxy of U.S. Pat. No. 4,874,643, the present amine curing agent cures without blush and $CO_2$ incorporation.

More particularly, the present invention provides for new and improved amine adducts that embody amine curing agents containing the aliphatic silane aromatic nucleus disclosed in U.S. Pat. No. 4,874.643 along with improved coatings made by combining the amine adduct with additional epoxy material. Specific embodiments of the amine adduct contain a bisepoxy compound, such as 2,11-bis(3-glycidylphenyl)-2,11 dimethyl-2,11-disiladodocane (referred to as HRG-3), for example, although other bisepoxy compounds may be used, while the amine functionalized compound may be ethylenediamine or aminoethylpiperazine, respectively. Coatings formed using these amine adducts after formulation and room temperature cure are tougher and perform better than room temperature cured materials described in U.S. Pat. No. 4,874,643.

The developed coatings, when used as a barrier layer, are useful in protecting composite surfaces from damage by plastic media blasting (PMB) paint removal operations. When barrier layers are applied directly on a composite surface, topcoat or primer and topcoat layers from materials such as urethanes, epoxies, acrylics, and the like, may be applied above it. When the topcoat or topcoat and primer layers are removed by means of plastic media blasting, the toughness of the amine adduct-based barrier layer retards the effect of plastic media blasting, providing a PMB operator sufficient time to remove the plastic media blasting stream from an area before damage to an underlying composite layer occurs.

The toughness of the barrier layer may be beneficial to primer and topcoat formulations created with the HRG-3 adduct, permitting the creation of new families of military and commercial paints and primers as well as specialty coatings such as radome, aircraft landing gear, and leading edge coatings, all with improved resistance to erosion by dirt and rain. These types of coatings are useful in products that require periodic paint stripping (such as aircraft control surfaces) or are exposed to severe environments (such as radome and landing gear coatings).

Epoxy coatings produced using the present invention cure much faster than the epoxy disclosed in U.S. Pat. No. 4,874,643. Using the present invention, recoating or rework of coated components can occur after only hours and final superior material properties occur in a cycle time considerably less than the prior art, and erosion resistance properties are achieved with thinner coatings than the prior art. The present invention provides for fast room temperature cure of erosion resistant materials.

BRIEF DESCRIPTION OF THE DRAWINGS

The various features and advantages of the present invention may be more readily understood with reference to the following detailed description taken in conjunction with the accompanying drawing FIGURE which illustrates the pertinent chemistry for combining bisepoxy and ethylenediamine to produce the improved reactive amine curing agents in accordance with the principles of the present invention.

DETAILED DESCRIPTION

Referring to the sole drawing figure, it illustrates pertinent chemistry for combining bisepoxy (HRG-3) and ethylenediamine to produce the improved reactive amine curing agents in accordance with the principles of the present invention. Several representative example of the present invention are described below. Those skilled in the art should be aware that the scope of the present invention is not limited by these specific examples.

Reduced-to-practice embodiments of two specific versions of the present invention are described below which use a specific bisepoxy compound, 2,11-bis(3-glycidylphenyl)-2,11 dimethyl-2,11-disiladodocane. However, it is to be understood that other bisepoxy compounds may be employed instead of the above-mentioned bisepoxy compound. Such other bisepoxy compounds include 2,5-(bis(3-glycidylphenyl)-2,5-dimethyl-2,5 disilahexane, 2,5-(bis(4-glycidylphenyl)-2,5-dimethyl-2,5 disilahexane, 1,3-(bis(4- glycidylphenyl)-1,1,3,3-tetramethyldisiloxane, 1,3-(bis(3-glycidylphenyl)-1,1,3,3-tetramethyldisiloxane, 1,5-(bis(3-glycidylphenyl)-1,1,3,3,5,5-hexamethyldisiloxane, and 1,7-(bis(3-glycidylphenyl)-1,1,3,3,5,5,7,7-octamethyldisiloxane, for example. Accordingly, the present invention is not limited to the specifically disclosed reduced to practice versions thereof.

In a typical synthesis, a bisepoxy compound, 2,11-bis(3-glycidylphenyl)-2,11 dimethyl-2,11-disiladodocane (compound 1), for example, is slowly added to an excess of an amine functionalized compound. The amine adduct is isolated by vacuum stripping (and/or heating) the excess amine compound. The pertinent chemistry for this process is shown in the drawing figure for the bisepoxy (HRG-3) and ethylenediamine compounds. In general, for the purposes of implementing the present invention, the isolation operation (vacuum stripping or heating, for example) may be performed at a temperature between 40–150° C. And preferably between 80–100° C.

Example 1. Synthesis, formulation, coating, curing and plastic media blasting (PMB) abrasion testing of an adduct of 2,11-bis(3-glycidylphenyl)-2,11dimethyl-2,11-disiladodocane (referred to as HRG-3) with ethylenediamine (compound 2).

In this first example, the bisepoxy compound, 2,11-bis(3-glycidylphenyl)-2,11 dimethyl-2,11-disiladodocane (compound 1, n=4, 49.4 g, 0.10 mol) was slowly added over a period of about 2 hours to a heated flask of ethylenediamine (90° C., 120.2 g, 20 mol). The mixture is stirred at 90° C. overnight and excess ethylenediamine was removed by vacuum evaporation using a rotary evaporator. The resulting viscous liquid had a mass of about 60.5 grams (98% of theoretical) and was characterized by both Carbon-13 and Proton NMR. The characterization was consistent with the resultant product shown at the lower right portion of the drawing figure after the arrow.

13CNMR (50.2 MHz, CDCl$_3$) 139.51, 138.90, 134.81, 131.00, 130.33, 126.65 (the previous six assignments are identified as 2×6=12 aromatic C), 70.91, 55.83, 53.33, 42.93, 42.15, 33.72, 29.36, 24.06, 15.81 (the previous nine assignments are identified as 2×9=18 aliphatic C), −2.90 (2×2=4 carbons, SiCH$_3$).

1HNMR (200 MHz, CDCl$_3$) 7.15–7.45 (m, 8H, aromatic), 4.1(brd s, 2H), 2.3–2.9 (m, 22H), 1.15–1.45(brd s, 12H), 0.65–0.85(m, 4H), 0.31(s, 12H).

Coating and curing. The bisepoxy ethylenediamine adduct described immediately above was formulated with several epoxy compounds. Both Heloxy 76 and Heloxy 107 epoxy resins, available from Shell Chemical were used. In a typical test, a substrate of S2 glass epoxy composite was coated with 8–10 mil of the formulated material and cured to a tack free surface overnight at room temperature. The coating had excellent visual appearance without blush or blotching. For the purposes of the present invention, room temperature is considered to be from 15–25° C.

PMB testing. After cure, the coated cured material was overcoated with a standard MIL epoxy primer and coating. In this example, the protective coating was overcoated with 1 mil of MIL-P 23377 primer and 3 mil of MIL-C-85285 urethane topcoat. After standard cure of the coating the sample was exposed to plastic media blast test using a Venturi gun at 80 psi pressure and a siphon feed of type V acrylate media 16–20 mesh per MIL-V-85891A. The coating protected the substrate significantly longer than conventional room temperature curing formulations.

Example 2. Synthesis, formulation, coating, curing and plastic media blasting (PMB) abrasion testing of the adduct of HRG-3 with aminoethylpiperazine.

In this second example, 2,11-bis(3-glycidylphenyl)-2,11dimethyl-2,11-disiladodocane (compound 1, n=4, 101 g, 0.20 mol), was slowly added over a period of about 2 hours to a heated flask of aminoethylpiperazine (80° C., 101 g, 0.78 mol). The mixture was stirred at 80° C. for an additional 2 hours and the excess aminoethylpiperazine was removed in a vacuum using a rotary evaporator. The resulting viscous liquid had a mass of 123 grams (98% of theoretical) and was characterized by both Carbon-13 and Proton NMR. The characterization was consistent with its chemical structure.

13CNMR. The complicated spectra had two sets of peaks with height difference of about 2 to 1. This was consistent with addition of the base to the epoxy compound from either the primary or secondary amine side of the aminoethylpiperazine.

1HNMR (200 MHz, CDCl$_3$) 7.15–7.45 (m, 8H, aromatic), 3.8 (brd m, 2H), 2.1–2.9 (m, 32H), 1.15–1.45 (brd s, 12H), 0.65–0.85 (m, 4H), 0.31 (s, 12H).

Formulation, room temperature curing and test resulted in materials with properties nearly identical to Example 1 and improved upon the prior art of U.S. Pat. No. 4,874,643.

For the purposes of completeness, presented below is a description of one method of forming an amine terminated aromatic silane epoxy coating in accordance with the principles of the present invention. A reactive amine curing agent is formed by mixing a bisepoxy compound with an excess of an amine functionalized compound, and removing excess amounts of the amine functionalized compound from the mixture. The formed reactive amine curing agent is formulated with an epoxy material to form a coating material. The formulated coating is deposited on a surface to be coated. The coating material is cured to form the protective coating.

Furthermore, the present invention provides for various compounds which have the formula:

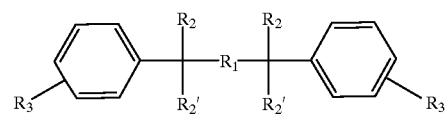

where R1 is selected from the group consisting of: (a) an aliphatic hydrocarbon group containing 2 to 10 carbon atoms, and (b) a group having the formula

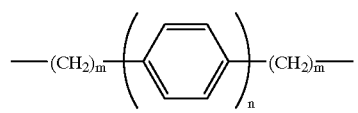

where n=1 to 3, m=0 to 5, R$_2$ and R$_{2'}$ are each selected from the group consisting of an alkyl group containing 1 to 4 carbon atoms, an unsubstituted aryl group, and a substituted aryl group, and R$_3$ is selected from the group consisting of:

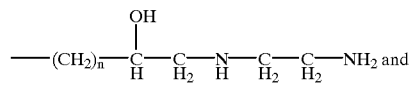

-continued

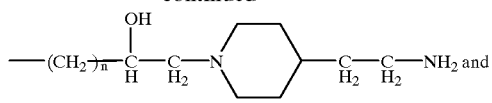

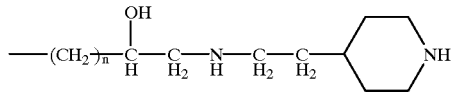

where n = 0 to 10;

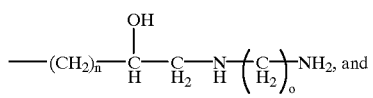

where n = 0 to 10
and o = 2 to 10

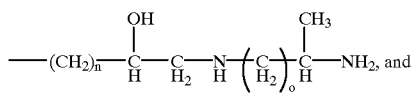

where n = 0 to 10
and o = 2 to 10

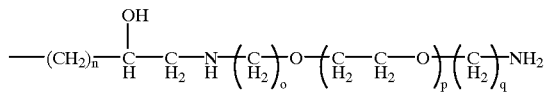

where n = 0 to 10
where o, q are each 2 to 10 and where p = 1 to 10:

or $R_3$ is selected from the group consisting of:

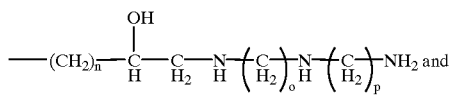

where n = 0 to 10 and
o and p are each = 2 to 10

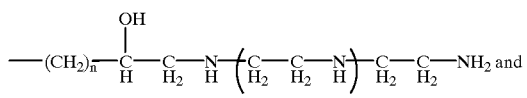

where n = 0 to 10 and o = 1 to 10

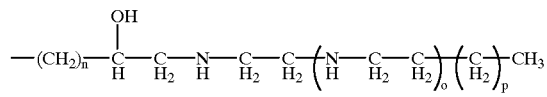

where n = 0 to 10 and
o and p are each 1 to 10 or:

$R_3$ is selected from the group consisting of:

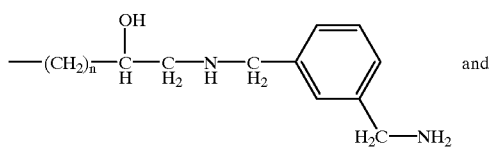

-continued

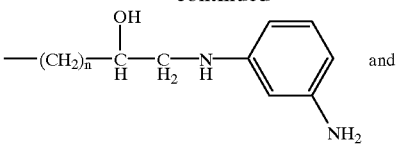

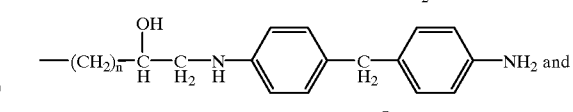

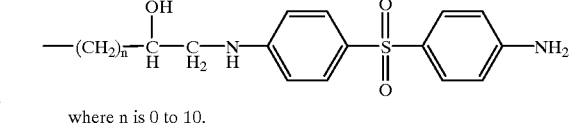

where n is 0 to 10.

Thus, an improved reactive amine curing agent along with improved aromatic silane coatings have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention. For example, curing agents other than the amine curing agents described above may be used to produce the present reactive amine curing agents in a manner known to those skilled in the art. Furthermore, other amine functionalized compounds may also be used which are chemically similar to those described above.

What is claimed is:

1. A method of forming a silicon-containing reactive amine curing agent comprising the steps of:

mixing a silicon-containing bisepoxy compound with an excess of an amine functionalized compound; and removing excess amounts of the amine functionalized compound from the mixture.

2. The method of claim 1 wherein the bisepoxy compound comprises 2,11-bis(3-glycidylphenyl)-2,11dimethyl-2,11-disiladodocane.

3. The method of claim 1 wherein the bisepoxy compound is selected from the group including 2,11-bis(3-glycidylphenyl)-2,11dimethyl-2,11-disiladodocane, 2,5-(bis (3-glycidylphenyl)-2,5-dimethyl-2,5disilahexane, 2,5-(bis (4-glycidylphenyl)-2,5-dimethyl-2,5 disilahexane, 1,3-(bis (4-glycidylphenyl)-1,1,3,3-tetramethyldisiloxane, 1,3-(bis (3-glycidylphenyl)-1,1,3,3-tetramethyldisiloxane, 1,5-(bis (3-glycidylphenyl)-1,1,3,3,5,5-hexamethyldisiloxane, and 1,7-(bis(3-glycidylphenyl)-1,1,3,3,5,5,7,7-octamethyldisiloxane.

4. The method of claim 1 wherein the removing step comprises vacuum stripping excess amine functionalized compound from the mixture.

5. The method of claim 1 wherein the removing step comprises heating the mixture to remove the excess amine functionalized compound therefrom.

6. The method of claim 1 wherein the removing step comprises vacuum evaporating excess amine functionalized compound from the mixture using a rotary evaporator.

7. The method of claim 1 wherein the bisepoxy compound is slowly added to the amine functionalized compound over a period of about 2 hours.

8. The method of claim 1 wherein the amine functionalized compound comprises aminoethylpiperazine.

9. The method of claim 2 wherein the amine functionalized compound comprises aminoethylpiperazine.

10. A method of forming a composition of matter comprising the steps of:
   mixing a silicon-containing bisepoxy compound with an excess of an amine functionalized compound; and
   removing excess amounts of the amine functionalized compound from the mixture to form a reactive amine curing agent.

11. A compound having the formula:

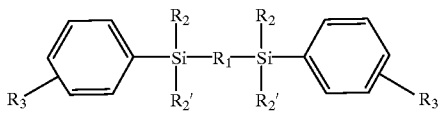

where $R_1$ is selected from the group consisting of:
(a) an aliphatic hydrocarbon group containing 2 to 10 carbon atoms, and
(b) a group having the formula

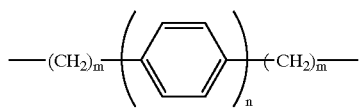

where n=1 to 3, m=0 to 5, and $R_2$ and $R_{2'}$ are each selected from the group consisting of an alkyl group containing 1 to 4 carbon atoms, an unsubstituted aryl group and a substituted aryl group; and
$R_3$ is selected from the group consisting of:

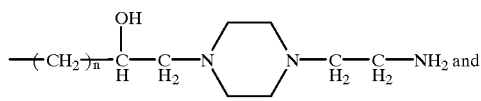

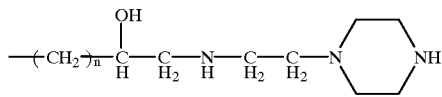

where n=0 to 10;
and combinations thereof.

12. A compound having the formula:

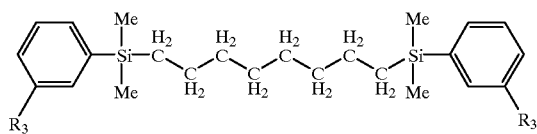

where $R_3$ is selected from the group consisting of:

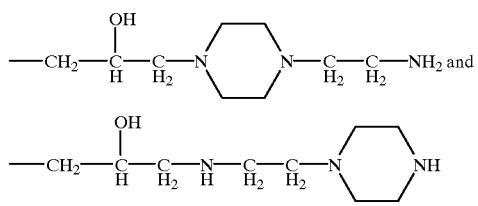

and combinations thereof.

13. An epoxy coating formed by:
mixing an epoxy material with a compound having the formula:

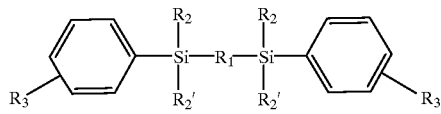

where $R_1$ is selected from the group consisting of:
(c) an aliphatic hydrocarbon group containing 2 to 10 carbon atoms, and
(d) a group having the formula

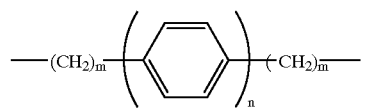

where n=1 to 3, m=0 to 5, and $R_2$ and $R_{2'}$ are each selected from the group consisting of an alkyl group containing 1 to 4 carbon atoms, an unsubstituted aryl group and a substituted aryl group; and
$R_3$ is selected from the group consisting of:

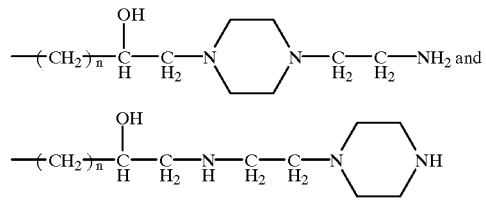

where n=0 to 10;
and combinations thereof;
depositing the epoxy coating material on a surface to be coated; and
curling the deposited epoxy coating material to form the epoxy coating.

14. An abrasion-resistant epoxy coating formed by:
mining an epoxy material with a compound having the formula:

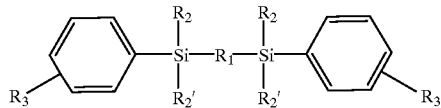

where $R_1$ is selected from the group consisting of:
(e) an aliphatic hydrocarbon group containing 2 to 10 carbon atoms, and
(f) a group having the formula

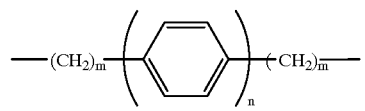

where n=1 to 3, m=0 to 5, and $R_2$ and $R_{2'}$ are each selected from the group consisting of an alkyl group containing 1 to 4 carbon atoms, an unsubstituted aryl group and a substituted aryl group; and $R_3$ is selected from the group consisting of:
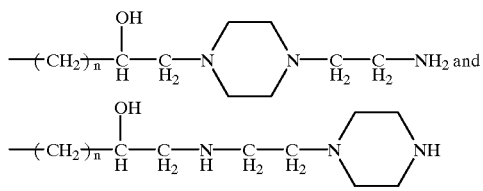
where n=0 to 10;
and combinations thereof;
depositing the epoxy coating material on a surface to be coated; and
curing the deposited epoxy coating material to form the abrasion-resistant epoxy coating.
* * * * *